United States Patent
Johansson

[11] Patent Number: 5,361,288
[45] Date of Patent: Nov. 1, 1994

[54] SPACER WITH INTEGRAL ZIRCALOY SPRINGS

[75] Inventor: Eric B. Johansson, Wrightsville Beach, N.C.

[73] Assignee: General Electric Company, San Jose, Calif.

[21] Appl. No.: 106,740

[22] Filed: Aug. 16, 1993

[51] Int. Cl.⁵ ............................................. G21C 3/34
[52] U.S. Cl. .................... 376/441; 376/439; 376/442
[58] Field of Search ............... 376/441, 439, 442, 448, 376/457; 976/DIG. 78

[56] References Cited

U.S. PATENT DOCUMENTS

| | | | |
|---|---|---|---|
| 3,442,763 | 5/1969 | Chetter et al. | 376/442 |
| 3,772,148 | 11/1973 | Seddon | 376/441 |
| 3,886,038 | 5/1975 | Raven | 376/442 |
| 4,005,521 | 2/1977 | Kaplan et al. | 29/469 |
| 4,089,742 | 5/1978 | Amaral et al. | 376/440 |
| 4,357,298 | 11/1982 | Wolters, Jr. et al. | 376/441 |
| 4,508,679 | 4/1985 | Matzner et al. | 376/438 |
| 4,544,522 | 10/1985 | Curulla et al. | 376/441 |
| 4,556,531 | 12/1985 | Curulla | 376/441 |
| 4,571,324 | 2/1986 | Johansson et al. | 376/441 |
| 4,587,704 | 5/1986 | Matzner et al. | 29/446 |
| 4,735,769 | 4/1988 | Lettau | 376/441 |
| 4,772,447 | 9/1988 | Manson et al. | 376/441 |
| 4,869,865 | 9/1989 | White et al. | 376/260 |
| 4,888,152 | 12/1989 | Razafindrazaka | 376/462 |
| 4,913,707 | 4/1990 | Moreno et al. | 29/792 |
| 4,913,875 | 4/1990 | Johansson et al. | 376/439 |
| 4,924,586 | 5/1990 | King, Jr. et al. | 29/723 |
| 4,931,615 | 6/1990 | Muncy et al. | 219/121.67 |
| 4,946,587 | 8/1990 | Reeves et al. | 209/539 |
| 4,999,153 | 3/1991 | Johansson et al. | 376/443 |
| 5,002,726 | 3/1991 | Johansson | 376/448 |
| 5,032,351 | 7/1991 | Johansson | 376/438 |
| 5,069,864 | 12/1991 | Johansson | 376/441 |
| 5,078,961 | 1/1992 | Johansson et al. | 376/448 |
| 5,085,827 | 2/1992 | Johansson et al. | 376/444 |
| 5,089,221 | 2/1992 | Johansson et al. | 376/442 |
| 5,130,083 | 7/1992 | Johansson | 376/441 |
| 5,173,252 | 2/1992 | Johansson | 376/442 |
| 5,178,825 | 1/1993 | Johansson | 376/438 |
| 5,186,891 | 2/1993 | Johansson et al. | 376/438 |
| 5,209,899 | 5/1993 | Johansson et al. | 376/442 |

FOREIGN PATENT DOCUMENTS 1190669  7/1985  Canada .

Primary Examiner—Donald P. Walsh
Assistant Examiner—Meena Chelliah
Attorney, Agent, or Firm—J. S. Beulick

[57] ABSTRACT

An all Zircaloy spacer having integral springs and single metallic layer spacer thickness between fuel rods is disclosed. Each spacer cell includes upper and lower octagonal crowns. These octagonal crowns have a full panel height adjoining the defined sub-channel volume between fuel rods and half panel heights adjoining adjacent cells. The crowns at opposite ends of each octagonal spacer cell are designed to interleave to form a single wall thickness of the spacer material. Accordingly, half wall heights at one crown are defined toward the spacer cell while half wall heights at the other crown end are defined away from the spacer cell. By inverting and adjoining the respective spacer cells at their respective crowns, the crowns form upper and lower crown matrices holding adjoining cells of the spacer together. From two adjacent sides of the four sub-channel adjacent full height sides, cell legs extend between the crowns with upper and lower stops immediately adjacent the crowns. From the remaining two adjacent sides of the four sub-channel adjacent full height sides, cell legs extend between the crowns defining the required cell springs with spring contact points centrally of the legs with respect to the crowns. The leg length is set to give the required stiffness for the springs. A spacer is disclosed constructed from a matrix of such cells preferably including inner and outer bands for adjoining any central water rod and surrounding channel.

10 Claims, 5 Drawing Sheets

SPACER WITH INTEGRAL ZIRCALOY SPRINGS

This invention relates to nuclear fuel bundle spacers for boiling water nuclear reactors. More particularly, a fuel bundle spacer is disclosed, having upper and lower continuous octagonal grids formed of single metallic layer thickness. The spacer also includes integral springs and stops built into the body of an all Zircaloy material spacer.

BACKGROUND OF THE INVENTION

Modern nuclear fuel bundles for boiling water nuclear reactors include a matrix of vertical upstanding and sealed nuclear fuel rods. These fuel bundles are held together by a lower tie plate for supporting the fuel rods and permitting the entry of water, and an upper tie plate for permitting the exit of water and generated steam. Some of the fuel rods connect to the tie plates and together with the tie plates hold the fuel rods of the fuel bundle together as a discrete unit. This fuel bundle unit is placed within a so-called channel.

In operation, the channel serves to isolate flow in the channel interior discretely through the rods of the fuel bundle. This interior flow is a characteristic particular to boiling water nuclear reactors and is away from a surrounding water filled core bypass region. The core bypass region which is filled with water provides improved moderation when the reactor is operating. Penetration of control rods into the core bypass region to displace the water and absorb neutrons occurs to control of the reaction.

The individual fuel rods are long—in the order of 160 inches—and slender. Under the dynamics of steam generation and absent any kind of restraint, these fuel rods would vibrate into abrading contact one with another. For this reason, there has developed in the art so-called fuel rod spacers.

The general construction and function of the fuel rod spacers is generally easy to understand. Specifically, a fuel spacer discretely surrounds each fuel rod at a discrete cell in a matrix of fuel rod cells within each spacer. Generally, five to nine—and usually seven—such spacers are utilized at differing elevations along the length of the fuel bundle. The result is that the fuel rods at the differing elevations along the length of the fuel bundle are held in a centered relationship.

Spacers cells surrounding each fuel rod have two primary structures acting on the fuel rods. These structures are a system of stops and springs for centering of the fuel rod. The stops define the design centered positions of the fuel rods. When the fuel rods are pushed against the stops of each spacer cell, the fuel rod is in its centered position. The springs provide the biasing force. When the fuel rods are biased by the springs into the stops of each spacer cell, centering of the fuel rod in its matrix position occurs.

Spacers can be classified by the material from which they are constructed. First, there have been spacers with Zircaloy bodies. These Zircaloy bodies define each cell as well as the individual rod stops required for each cell. The necessary springs have heretofore been Inconel springs. These Inconel springs have been held in place by surrounding parts of the Zircaloy cells.

Other spacers have been made just from Inconel. These spacer usually define a fine matrix of Inconel and contain integrally both spring and stops formed into the Inconel.

The choice between the two types of spacer construction involves balancing of both nuclear design factors for optimized nuclear reaction as well as the thermodynamic design factors for the generation of steam.

Over simplified, from the standpoint of neutron absorption, Zircaloy spacers are preferred. Simply stated., the neutron absorption cross section of Zircaloy is low compared to that of Inconel. Less neutron absorption gives greater nuclear efficiency over the life cycle of the fuel bundle.

Unfortunately, Inconel has a much higher neutron absorption cross section. Thus, the use of the Inconel springs directly detracts from the nuclear efficiency of Zircaloy spacers.

Over simplified, ferrule type spacers which surround each fuel rod are generally preferred from a thermodynamic standpoint, especially in the upper two phase region of the fuel bundle. It has been found that this more complete surround in the upper two phase region of the fuel bundle can have beneficial effects on critical power by maintaining a water layer over the surface of the steam generating fuel rods.

The ferrules of the prior art have been either round or octagonal. Where such spacers are octagonal, the respective octagons of a matrix of spacer cells surround each fuel rod. In between immediate adjacent fuel rods, the flat sides of the octagon are joined. Diagonally of the fuel rods, the flat sides of the octagon cells define a bounded flow space within a so-called "sub-channel" flow volume within the fuel bundle. Since the following invention relates to a generally octagon shaped spacer, understanding of such terminology is important.

Unfortunately, modern fuel bundle designs in boiling water nuclear reactors have added a further complicating factor. The density of the fuel rod matrix has increased. Fuel bundle matrices have increased from 8 by 8, to 9 by 9, 10 by 10, and even 11 by 11. Such increase directly impacts on the dimensions available to contain the spacer material between the fuel rods. Remembering that the cross section of the fuel bundle is a design parameter established in the original construction of the reactor, this relationship is relatively easy to understand.

Nuclear fuel rods have cylindrical Zircaloy cladding surrounding the contained nuclear fuel pellets. Taking the case of a matrix of increased density, more of the available area within the fuel bundles simply has to be occupied by the walls of the Zircaloy ferrules, which ferrules are nominally in the order of 0.020 to 0.030 inches thick. Taking the case of a 10 by 10 matrix with fuel rod diameter=0.404", center to center spacing=0.510", the gap between two adjacent fuel rods is 0.106". Two thicknesses of ferrule material uses at least 0.40" of this gap. As a result, design pressure is on spacer construction to occupy as little of the interval as possible.

Regarding this design pressure, reduction of the space occupied by the spacer between individual fuel rods to a single layer of metal is vital. Unfortunately, prior art Zircaloy ferrule spacer constructions having Inconel spring material trapped to the Zircaloy material of the spacer body have required double layers of metal within the spacer. Further, the corrosion properties of Zircaloy require that this metal be maintained in a nominal thickness in the order of about 0.020 of an inch.

Having set forth these parameters, the following summarized invention can be understood.

SUMMARY OF RELATED ART

In U.S. Pat. No. 5,130,083 entitled HYDRIDE RESISTANT SPACER FORMED FROM INTERLOCKING STRIPS issued Jul. 15, 1992 (filed Aug. 15, 1991) a spacer having single wall thickness at upper and lower planes of the spacer was disclosed. Unlike the following disclosure, this spacer was made from a group of strips all having differing length and bent and interlocked to form the ultimate hexagonal cells of the spacer.

SUMMARY OF THE INVENTION

An all Zircaloy spacer having integral springs and single metallic layer spacer thickness between fuel rods is disclosed. Each spacer cell includes upper and lower octagonal crowns. These octagonal crowns have a full panel height adjoining the defined sub-channel volume between fuel rods and half panel heights adjoining adjacent cells. The crowns at opposite ends of each octagonal spacer cell are designed to interleave to form a single wall thickness of the spacer material. Accordingly, half wall heights at one crown are defined toward the spacer cell while half wall heights at the other crown end are defined away from the spacer cell. By inverting and adjoining the respective spacer cells at their respective crowns, the crowns form upper and lower crown matrices holding adjoining cells of the spacer together. From two adjacent sides of the four sub-channel adjacent full height sides, cell legs extend between the crowns with upper and lower stops immediately adjacent the crowns. Placement of the stops adjacent the crowns results in a very high stiffness when the fuel rod is forced against the stops. From the remaining two adjacent sides of the four sub-channel adjacent full height sides, cell legs extend between the crowns defining the required cell springs with spring contact points centrally of the legs with respect to the crowns. Placement of the rod contact points at the mid points of these legs results in a flexible structure, so that these legs act as springs. The length of the legs and the cell height is chosen to give the required spring stiffness. A spacer is disclosed constructed from a matrix of such cells preferably including inner and outer bands for adjoining any central water rod and surrounding channel.

BRIEF DESCRIPTION OF THE DRAWINGS

FIGS. 4A, 4B and 4C are respective plan and projected side elevations illustrating the joined spacer crowns in FIG. 4A and the projected side elevations of the cells in FIGS. 4B and 4C so that the construction of a similar crown matrix at the bottom of the fuel bundle can be understood;

DESCRIPTION OF THE PREFERRED EMBODIMENT

Figure 1:
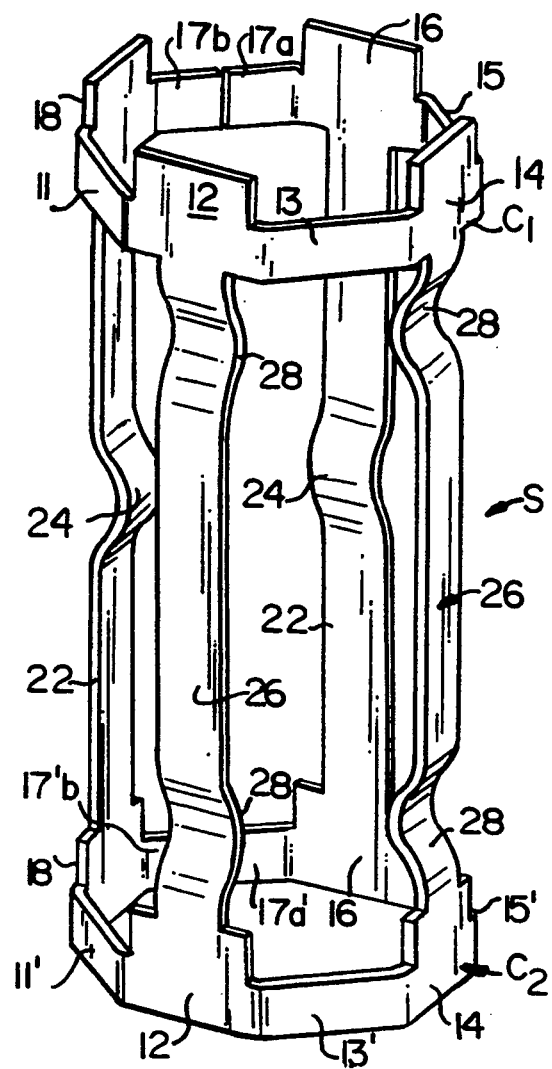
FIG. 1 is a perspective view of a single spacer cell constructed in accordance with this invention.

Referring to FIG. 1, a spacer cell S according to this invention is shown. Spacer cell S includes upper octagonal crown $C_1$ and lower octagonal crown $C_2$. In the following description, crown $C_1$ will first be described. Thereafter, the differences between crown $C_1$ and crown $C_2$ will be set forth. Finally the respective spring legs 22 and stop legs 26 extending between the crowns $C_1$ and $C_2$ will be described.

Crown $C_1$ is octagonal in shape. It includes full height panels 12, 14, 16, and 18. These respective panels are interconnected by half height panels 11 between full height panels 18 and 12, half height panel 13 between full height panels 12 and 14, half height panel 15 between full height panels 14 and 16, and finally half height panels $17_a$ and $17_b$ between full height panels 16 and 18. A complete octagon having equal length sides is formed.

Crown $C_2$ differs from crown $C_1$ in that the respective half height panels $11'$, $13'$, $15'$ and $17_a'$, $17_b'$, all extend upwardly with respect to cell S of FIG. 1. Thus it can be seen that the half height panels of crown $C_1$ are defined to the inside of cell S. Likewise, it can be seen that the half height panels of crown $C_2$ are defined to the outside of cell S. These features will become important when considering the mating relationship of the respective cells illustrated in FIGS. 2 and 3.

Paired spring legs 22 are easy to understand. Each leg begins at a full height panel 16 or 18 in crown $C_1$ and extends to a corresponding full height panel $16'$ or $18'$ in crown $C_2$. For biasing a fuel rod, a bias point is formed by inwardly arcuate portion 24 medially located in each leg 22. It will be observed that the spring legs 22 are adjacent one another.

Paired stop legs 26 are likewise easy to understand. Each leg begins at a full height panel 12 or 14 in crown $C_1$ and extends to a corresponding full height panel $12'$ or $14'$ in crown $C_2$. For stopping a biased fuel rod in a centered disposition with respect to cells, stop points are formed by inwardly arcuate portions 28 distally located in each leg against a crown $C_1$ or $C_2$. It will be observed that the stop legs 26 are adjacent one another.

Thus it will be understood that each cell S includes at its two stop legs four inwardly arcuate stop portions 28 for the centering of the fuel rods. Further, it will be seen that each cell S includes at its spring legs two inwardly biased spring portions 24. Consequently, bias of a fuel rod R onto the four stops by two spring portions occurs.

Figure 2:
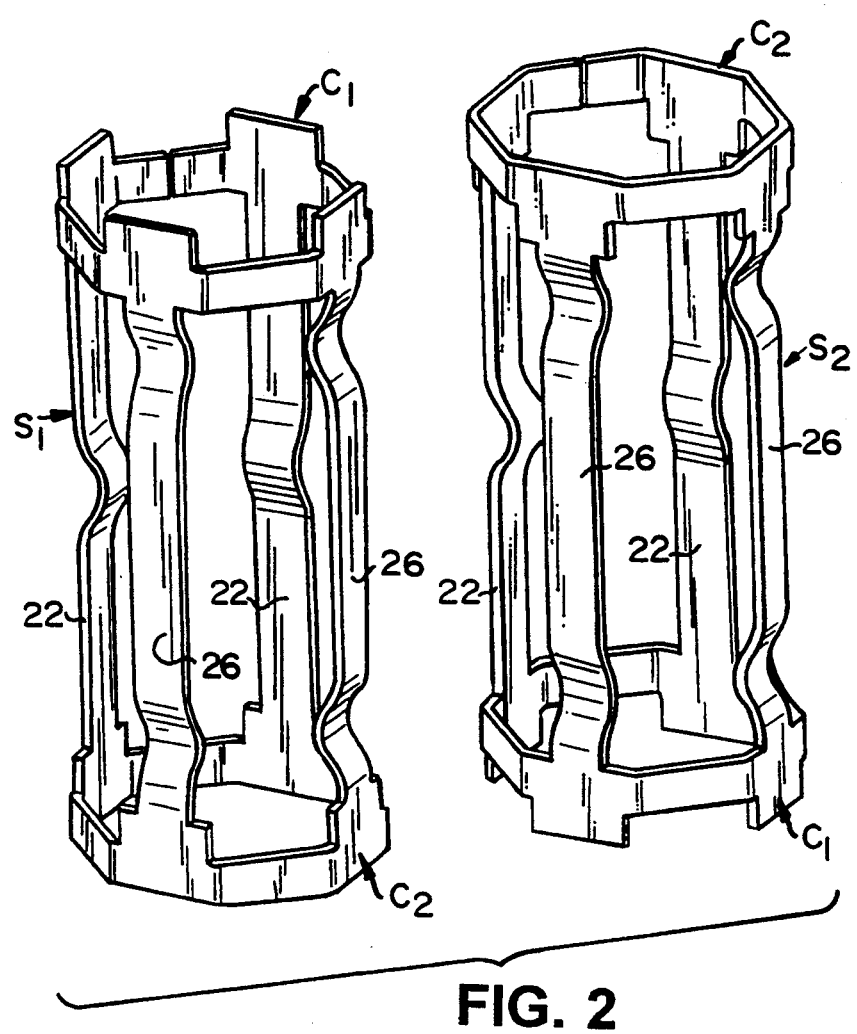
FIG. 2 is a perspective view similar to FIG. 1 of two spacer cells illustrating how the spacer cells adjoin one another.
Figure 3:
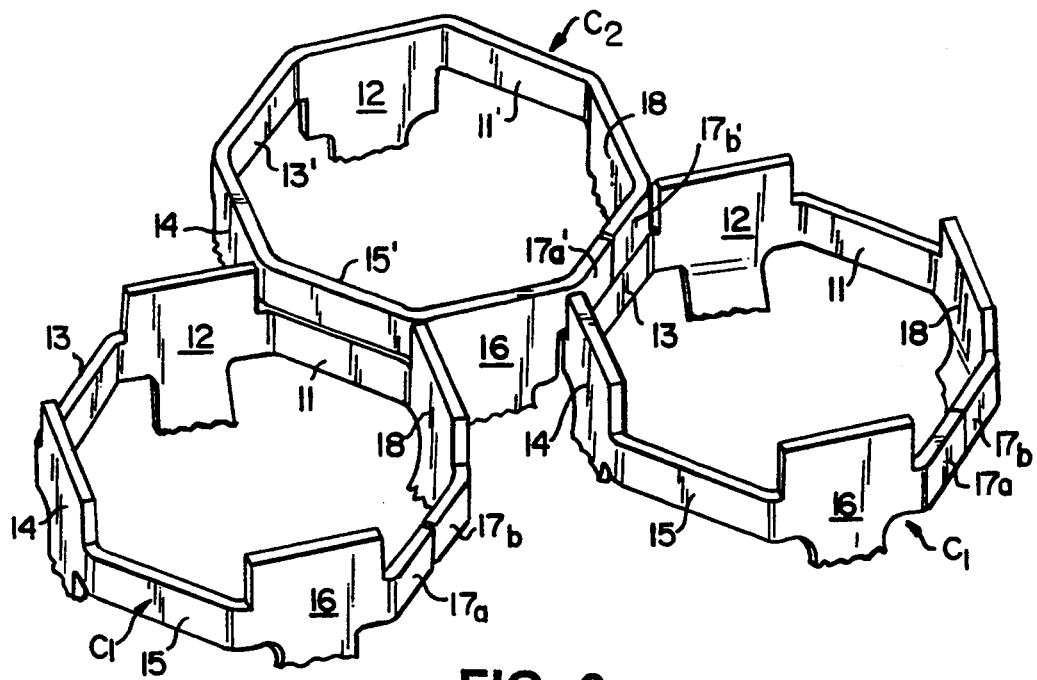
FIG. 3 is a detail of the tops of three adjacent cells at their respective crown portion only, the view illustrating how the respective cells fit together in single thickness at the matrix defined by the crowns.

Referring to FIG. 2, cells $S_1$ and $S_2$ are shown about to be joined. Cell $S_1$ has crown $C_1$ at the top and crown $C_2$ at the bottom. Conversely, cell $S_2$ has crown $C_2$ at the top and crown $C_1$ at the bottom. Turning to FIG. 3, the fitting between the mating horizontal edges of respective half height walls of respective crowns $C_1$ and $C_2$ can easily be understood. Specifically, it will be seen that respective half height walls 11 of first crown $C_1$ fits with half height wall $15'$ of crown $C_2$. Likewise, half height wall 13 of second crown $C_1$ fits with vertically aligned and substantially co-planar half height walls $17_a'$ and $17_b'$ of crown $C_2$. It takes little imagination to understand that a continuum of joined crowns $C_1$ and $C_2$ will form a crown plane at the top and bottom of each spacer matrix.

Figures 4, 4A, 4B:
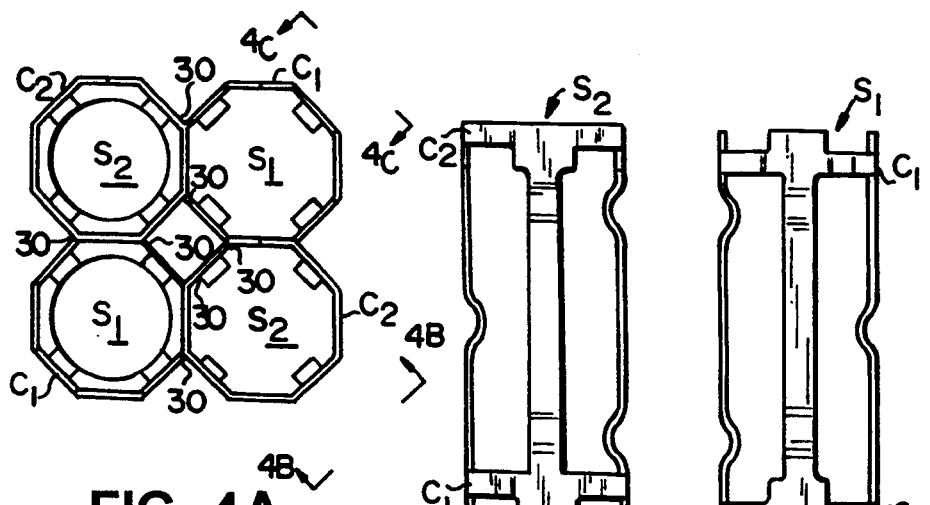

Referring to respective FIGS. 4A, 4B and 4C, two cells $S_1$ and two cells $S_2$ are shown joined to form a matrix of four such cells. Cells $S_1$ have respective crowns $C_1$ on top and crowns $C_2$ on the bottom. Conversely, cells $S_2$ have respective crowns $C_2$ on top and crowns $C_1$ on the bottom.

It will further be understood that just as crown $C_1$ and $C_2$ form a crown plane on the top, crowns $C_2$ and $C_1$ will form a crown plane on the bottom.

Joining of the respective crowns $C_1$ and $C_2$ is easy to understand. Referring to FIG. 3, welds are made at the top of crown $C_1$ and $C_2$ at the junctions of the full height walls. Referring to FIG. 4A, welds are made at the junctions 30.

Figure 5:
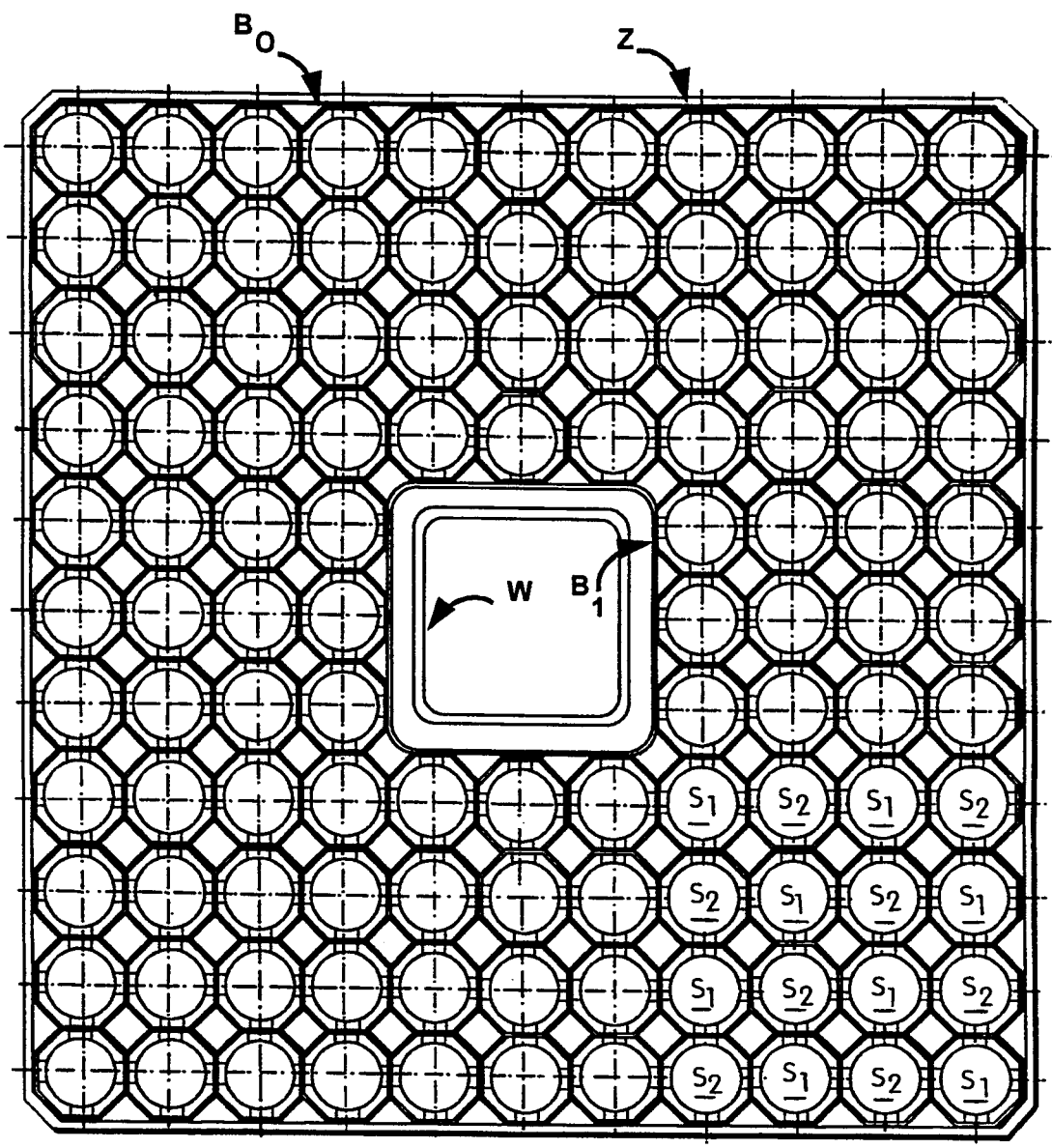
FIG. 5 is a plan view of the completed matrix here illustrated in an 11 by 11 format with an inner band for surrounding a water rod and an outer band for adjoining a surrounding channel.

Referring to FIG. 5, a spacer Z having an outside band $B_o$ for abutting a fuel bundle channel and an inside band $B_i$ for abutting a water rod is illustrated. For the convenience of the reader, the orientation of cells $S_1$ and $S_2$ is illustrated in the lower left corner of the spacer array—the remainder of the array being a continuum.

Figure 6:
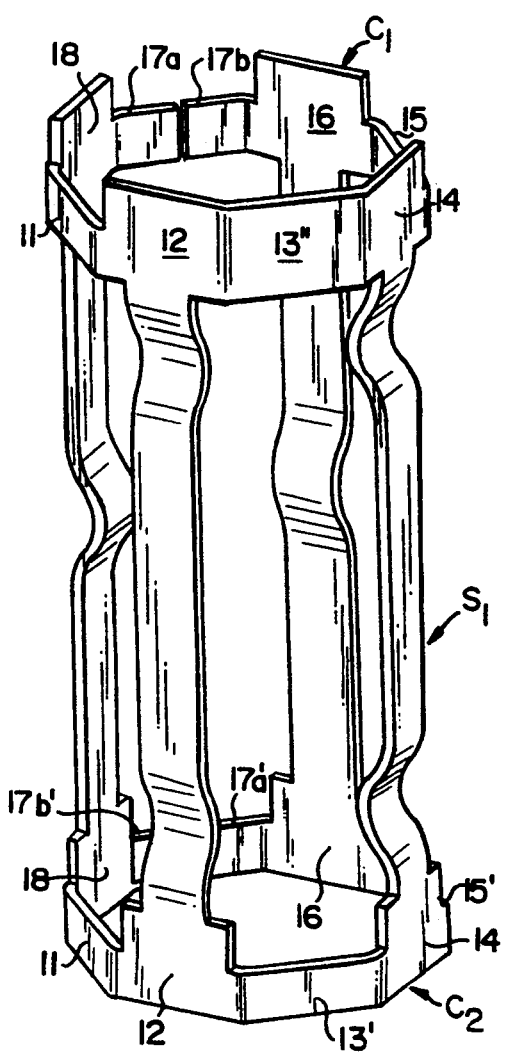
FIG. 6 is a perspective view of a modified cell structure for adjoining the periphery of the band; and, FIG. 7 is a perspective view of a fuel bundle provided so the reader can understand the placement of the spacers in a completed fuel assembly.

Adjacent band $B_o$ and $B_i$ it is desirable to have full height walls in order to weld at the tops of the cells $S_1$ to the bands. Accordingly in FIG. 6, a full height wall 13" is illustrated in crowns $C_1$. It will be noted that since on crown $C_2$, half height wall 13' is formed to the outside of cell $S_1$, a full height wall is not needed.

Figure 7:
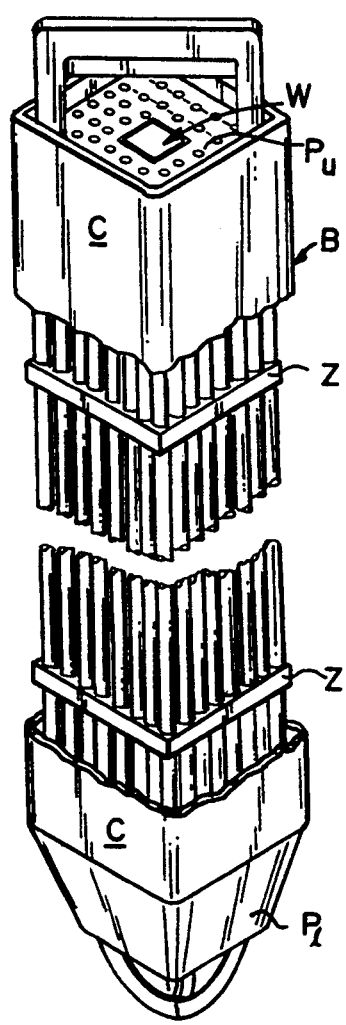

Referring to FIG. 7, a fuel bundle B is illustrated surrounded by a channel C. Channel C is broken away to show a matrix of fuel rods R having a central water rod W. Fuel rods extend between lower tie plate $P_l$ and upper tie plate $P_u$. The locations of two spacers Z is schematically illustrated.

The disclosed invention will admit of modification. For example, the half height walls here preferred will admit of modification. Crowns $C_1$ and $C_2$ could be provided with other mating upper and lower edges. For example, such edges could include repeating curved patterns. All that is required is that when the respective edges are juxtaposed, mating of the crowns to form a single layer occurs.

It will be further observed that compared to the Inconel spacers of the prior art, the Zircaloy construction here utilized requires a heavier and thicker metallic construction, especially for the Zircaloy spring legs 22. Accordingly, and over Inconel equivalents, the legs are on the order of 100% thicker.

What is claimed is:

1. In a spacer having a matrix of individual cells, each cell for surrounding a fuel rod in a corresponding matrix of fuel rods, said spacer comprising:
   a plurality of spacer cells;
   said cells each including stop means for centering said fuel rods with respect to said cells and spring means for biasing said fuel rods into said stop means of said cells;
   each said spacer cell including upper and lower octagonal crowns, said octagonal crowns panel heights adjoining adjacent cells including means for adjoining like panels from adjacent panel cells in a single thickness along horizontal edges such that said like panels are in substantially vertical, co-planar alignment.

2. In a spacer having a matrix of individual cells according to claim 1 and further including:
   said crowns at opposite ends of each octagonal spacer cell having inverted edge means; wherein respective cells surrounding a central cell are inverted with respect to said central cell whereby said crowns form a single thickness in forming upper and lower crown matrices holding adjoining cells of the spacer together.

3. In a spacer having a matrix of individual cells according to claim 1 and further including:
   said stop means includes cell legs extending between the crowns with upper and lower stops immediately adjacent the crowns; and,
   said spring means includes cell legs extending between the crowns defining the required cell springs with spring contact points centrally of the legs with respect to the crowns.

4. In a spacer having a matrix of individual cells according to claim 1 and further including:
   a full panel height adjoining the defined subchannel volume between fuel rods; and,
   half height walls adjoining adjacent cells.

5. In a spacer having a matrix of individual cells according to claim 4 and further including:
   said cell legs extending between four full height sides;
   two adjacent legs define upper and lower stops; and
   two adjacent legs define springs and spring contact points.

6. In a spacer having a matrix of individual cells according to claim 4 and further including:
   half wall heights at one crown panel are defined towards adjoining spacer cells and half wall heights at the other crown end are defined away from said spacer cell.

7. In a spacer having a matrix of individual cells, each cell for surrounding a fuel rod in a corresponding matrix of fuel rods, said spacer comprising:
   a plurality of spacer cells;
   said cells each including stop means for centering said fuel rods with respect to said cells and spring means for biasing said fuel rods into said stop means of said cells;
   each said spacer cell including upper and lower octagonal crowns, said octagonal crown panel heights adjoining adjacent cells including edge means for adjoining like panels in single thickness from adjacent panel cells including a full panel height adjoining the defined sub-channel volume between fuel rods and vertically aligned substantially co-planar half height walls adjoining adjacent cells; and
   said crowns at opposite ends of each octagonal spacer cell having inverted edge means; and wherein respective cells surrounding a central cell are inverted with respect to said central cell whereby said crowns form a single thickness in forming upper and lower crown matrices holding adjoining cells of the spacer together.

8. In a spacer having a matrix of individual cells according to claim 7 and further including:
   said stop means includes cell legs extending between the crowns with upper and lower stops immediately adjacent the crowns; and,
   said spring means includes cell legs extending between the crowns defining the required cell springs with spring contact points centrally of the legs with respect to the crowns.

9. In a spacer having a matrix of individual cells according to claim 7 and further including:
   outer band means surrounding said spacer for abutting a channel at said band means; and, a defined interior aperture of said matrix of spacer cells for receiving a water rod; and, inner band means lining said interior aperture.

10. In a spacer having a matrix of individual cells, each cell for surrounding a fuel rod in a corresponding matrix of fuel rods, said spacer comprising:

a plurality of spacer cells;

said cells each including stop means for centering said fuel rods with respect to said cells and spring means for biasing said fuel rods into said stop means of said cells;

each said spacer cell including upper and lower octagonal crowns, said octagonal crowns panel heights adjoining adjacent cells including edge means for adjoining like panels in single thickness form adjacent panel cells including a full panel height adjoining the defined sub-channel volume between fuel rods and vertically aligned substantially co-planar half height walls adjoining adjacent cells;

said crowns at opposite ends of each octagonal spacer cell having inverted edge means;

respective cells surrounding a central cell being inverted with respect to said central cell whereby said crowns form a single thickness in forming upper and lower crown matrices holding adjoining cells of the spacer together; wherein said stop means includes cell legs extending between the crowns with upper and lower stops immediately adjacent the crowns; and further wherein said spring means includes cell legs extending between the crowns defining the required cell springs with spring contact points centrally of the legs with respect to the crowns.

* * * * *